United States Patent
Narusawa et al.

(10) Patent No.: US 6,527,173 B1
(45) Date of Patent: Mar. 4, 2003

(54) SYSTEM OF ISSUING CARD AND SYSTEM OF CERTIFYING THE CARD

(75) Inventors: Kenji Narusawa, Yokohama (JP); Kazunori Namiki, Yokohama (JP); Toshiro Kohno, Yamato (JP); Tadashi Aizawa, Yamato (JP); Yoshinari Yokochi, Tokyo (JP); Haruo Matsuo, Yamato (JP); Manabu Sakane, Yokohama (JP)

(73) Assignee: Victor Company of Japan, Ltd., Kanagawa-ken (JP)

( * ) Notice: Subject to any disclaimer, the term of this patent is extended or adjusted under 35 U.S.C. 154(b) by 0 days.

(21) Appl. No.: 09/532,214

(22) Filed: Mar. 22, 2000

(30) Foreign Application Priority Data

| Mar. 30, 1999 | (JP) | ............................................. | 11-088128 |
| Mar. 30, 1999 | (JP) | ............................................. | 11-088129 |
| Jan. 11, 2000 | (JP) | ............................................. | 2000-002314 |
| Jan. 12, 2000 | (JP) | ............................................. | 2000-003375 |

(51) Int. Cl.$^7$ ................................................. G06K 5/00
(52) U.S. Cl. ...................... 235/380; 235/457; 235/494; 235/382
(58) Field of Search ................................. 235/380, 379, 235/457, 381, 382, 382.5

(56) References Cited

U.S. PATENT DOCUMENTS

| 4,761,543 A | * | 8/1988 | Hayden | ....................... | 235/457 |
| 5,268,963 A | * | 12/1993 | Monroe | ....................... | 380/23 |
| 5,336,871 A | * | 8/1994 | Colgate, Jr. | ................... | 235/380 |
| 5,900,954 A | * | 5/1999 | Katz et al. | ...................... | 359/2 |
| 6,182,891 B1 | * | 2/2001 | Furuhashi et al. | .......... | 235/379 |
| 6,269,348 B1 | * | 7/2001 | Pare, Jr. et al. | ............. | 705/309 |
| 6,328,209 B1 | * | 12/2001 | O'Boyle | ....................... | 235/380 |
| 6,388,558 B1 | * | 5/2002 | Emmei | ......................... | 340/5.2 |

FOREIGN PATENT DOCUMENTS

| JP | 7-92637 | 10/1995 |
| JP | 8-272917 | 10/1996 |
| JP | 9-282433 | 10/1997 |
| JP | 10-143603 | 5/1998 |
| JP | 10-143629 | 5/1998 |
| JP | 10-171334 | 6/1998 |
| JP | 10-198259 | 7/1998 |

\* cited by examiner

*Primary Examiner*—Thien M. Le
*Assistant Examiner*—Daniel A. Hess
(74) *Attorney, Agent, or Firm*—Anderson Kill & Olick; Eugene Lieberstein; Michael N. Meller

(57) ABSTRACT

The CGH (computer generated hologram) readout section (4) reproduces an image of the CGH (28), which is formed in the data storage area (52) of the crude card (26). The CGH certifying section (5) judges whether the card is genuine or fake and obtains an ID (identification) information. In a case that the card is genuine, the ID information is supplied to the data processing section (6). The data processing section (6) inputs a personal information of a person to be a cardholder and also inputs a face picture of the person. These data are registered in the database (2) in response to the ID information. A part of or all of the personal information is outputted to the IC reader/writer (8) and written into the IC module (53). Further, a part of the personal information and the face picture are outputted to the color printer (7) as a printing information and printed on the surface of the crude card (26). Then the personal ID card (51) can be issued after forming a protection film over the printed surface of the card.

17 Claims, 10 Drawing Sheets

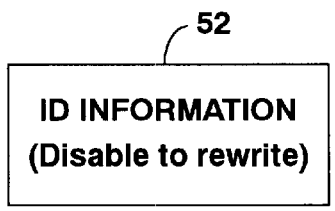
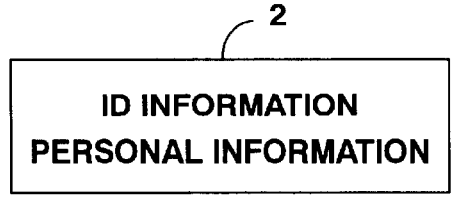
Fig. 13(a)    Fig. 13(b)
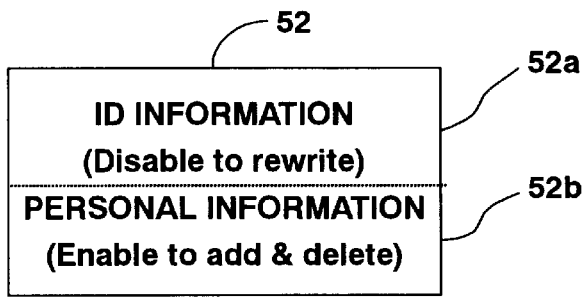
Fig. 14
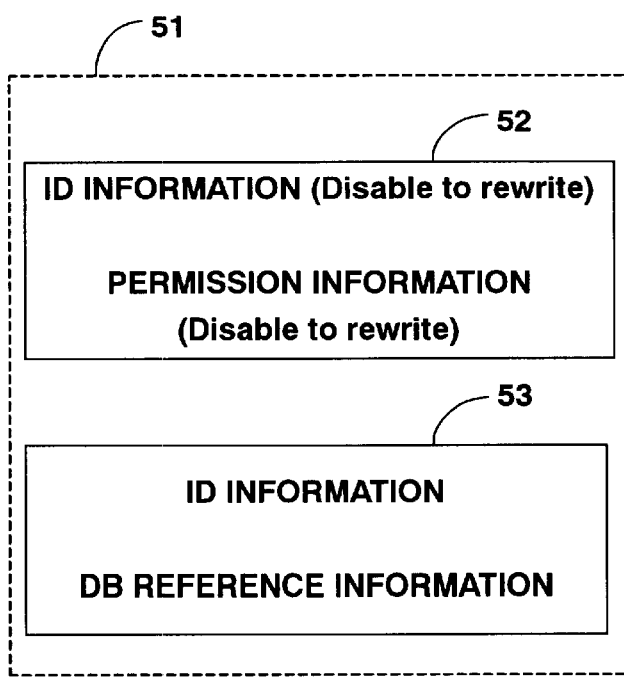
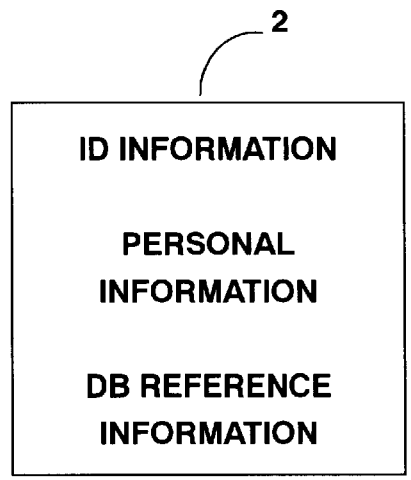
Fig. 15(a)    Fig. 15(b)

SYSTEM OF ISSUING CARD AND SYSTEM OF CERTIFYING THE CARD

BACKGROUND OF THE INVENTION

1. Field of the Invention

The present invention relates to a system of issuing a card, which is a card shaped optical recording medium and can be utilized as a personal identification (ID) card, and a system of certifying the card.

2. Description of the Related Art

A personal ID card such as a card shaped recording medium provided with an IC (Integrated Circuit) chip, which is recorded with a personal ID information, and a magnetic recording area is put to practical use, wherein a face picture of a person is affixed and inscriptions such as a name of the person is described on the card. The personal ID card is utilized for a staff member certificate or a transit pass so as to certify the person. Accordingly, it is necessary for the personal ID card that the personal ID information recorded in the IC chip or the magnetic recording area can not be counterfeited and that the face picture is hard to be replaced as well.

However, there existed a problem that information or data recorded in an IC chip or a magnetic recording area can essentially be rewritten. Therefore, it is hard to prevent a personal ID card from counterfeit. Further, it is also necessary for a certifying system to confirm that a personal ID card is surely utilized by an owner of the card.

SUMMARY OF THE INVENTION

Accordingly, in consideration of the above-mentioned problem of the prior art, an object of the present invention is to provide a system of issuing a card and a system of certifying the card, which solve problems in the prior arts mentioned above. In order to improve security of a personal ID card, a hologram, which has irreversibility such that information can not be rewritten although new information can be recorded additionally, is utilized for the rsonal ID card.

In order to achieve the above object, the present invention provides a system of issuing such a personal ID card and a system. of certifying the personal ID card.

According to an aspect of the present invention, there is provided a system of issuing a card (card issuing system) comprising: a readout device for reading out an identification (ID) information from a hologram, which is formed on a card shaped optical recording medium and outputs a predetermined reproduction pattern by being irradiated with a monochromatic light; a certifying device for certifying the ID information read out by the readout device and for judging the card shaped optical recording medium whether or not it is a genuine; a data processing device for inputting personal information such as name, sex, date of birth and blood type of a person in conjunction with picture images of a face and a finger print of the person and for registering the personal information and personal picture images into a database device corresponding to the ID information; and a printing device for printing at least a part of the personal information to be registered in the database device, which is pictured, on the card shaped optical recording medium.

According to another aspect of the present invention, there is provided a system (card certifying system) of certifying a card shaped optical recording medium having a data storage area, which is formed with a hologram of outputting a predetermined reproduction pattern including an ID information for recognizing each card shaped optical recording medium by being irradiated with a monochromatic light, the card certifying system comprising reproducing means for reproducing the reproduction pattern from the hologram formed in the data storage area, recognizing means for recognizing the ID information from the reproduction pattern reproduced by the reproducing means, reading out means for reading out a personal information of a cardholder registered in the database means and displaying means for displaying a part of the personal information.

According to further aspect of the present invention, there provided a system (card certifying system) of certifying a card shaped optical recording medium having an IC module and a data storage area, which is formed with a hologram of outputting a predetermined reproduction pattern including an ID information for recognizing each card shaped optical recording medium by being irradiated with a monochromatic light, said card certifying system comprising: a reproducing device for reproducing the reproduction pattern from the hologram formed in the data storage area; a recognizing device for comparing the reproduction pattern reproduced by the reproducing device with a recognition parameter previously stored in database device and for recognizing a content of the reproduction pattern; an access code producing device for producing an access code (CSC) of making access to the IC module; a reading out device for reading out a card data recorded in the IC module; a reading device for reading in a personal information of a card holder and a card ID information registered in the database device; a displaying device for displaying the card data read out from the IC module by the reading out device; a first comparing and displaying device for comparing the personal information and card ID information registered in the database device with the card data recorded in the IC module and recognition result done by the recognizing device and for displaying a result of comparing; an input device for taking a picture image such as a face and a finger print of the card holder and for inputting a personal ID number; a second comparing and displaying device for displaying a result of certifying the card holder by comparing the picture image stored in the database device and IC module with the picture image taken by the input device; and a writing device for writing a history of certification and a status of the card shaped optical recording medium into the database device and/or IC module.

According to furthermore aspect of the present invention, there provided a system (card certifying system) of certifying a card shaped optical recording medium having a first data storage area, which is formed with a hologram of outputting a predetermined reproduction pattern including an ID information for recognizing each optical recording medium and a permission information by being irradiated with a monochromatic light and a second data storage area, which stores a reference information of a database device, and is enabled to read out or rewrite by the permission information, the card certifying system comprising: a first reading out device for reading out the permission information from the first data storage area; a second reading out device for reading out the reference information stored in the second data storage area by utilizing the permission information read out by the first reading out device; a reading device for reading in at least a part of a personal information and a card ID information previously registered in the database device with attaching to the reference information by utilizing the reference information read out by the second reading out device; a comparing device for comparing the card ID information obtained by the reading device with the ID information read out by the first reading out device; and a displaying device for displaying at least one of a result information outputted from the comparing device and a first information read out by the first reading out device and a second information read out by the second reading out device and a fourth information obtained by the reading device.

Other object and further features of the present invention will be apparent from the following detailed description when read in conjunction with the accompanying drawings.

BRIEF DESCRIOPTION OF DRAWINGS

FIGS. 3(a) through 3(g) show each step of a process of producing a card shaped optical recording medium, which is utilized for the present invention.

Figure 4:
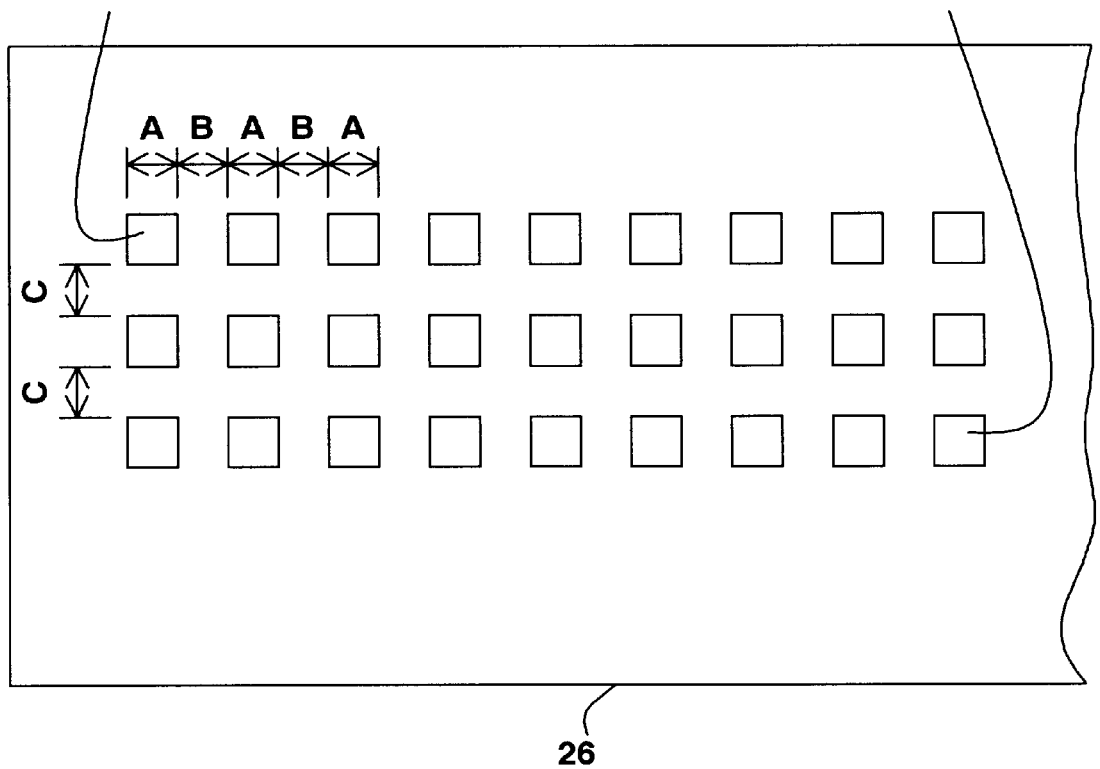

FIG. 4 is an enlarged plan view of a card shaped optical recording medium, which is utilized for the present invention.

Figure 5A:
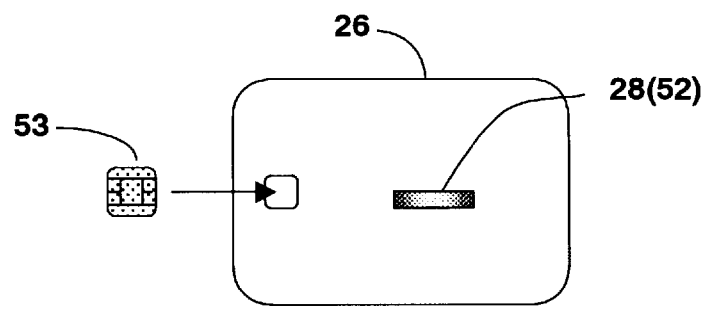
Figure 5B:
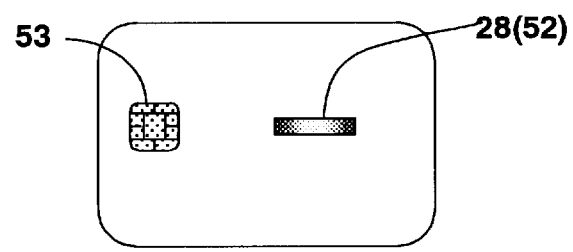
Figure 5C:
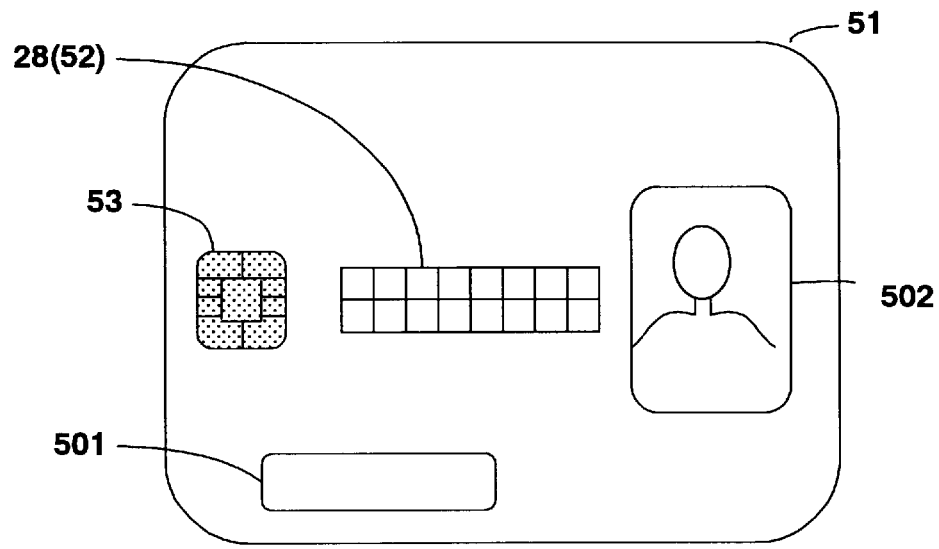

FIGS. 5(a) through 5(c) show each step of producing a card having an IC module or chip.

Figure 6:
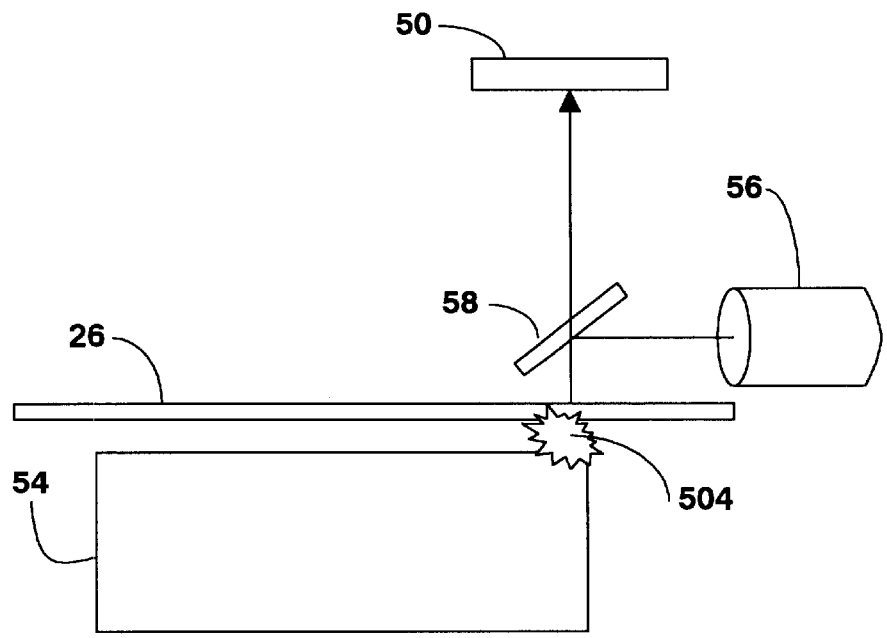

FIG. 6 shows a configuration of a recording apparatus for an optical recording medium, which records an identification signal in a data storage area of an optical recording medium according to the first embodiment of the present invention.

Figure 7:
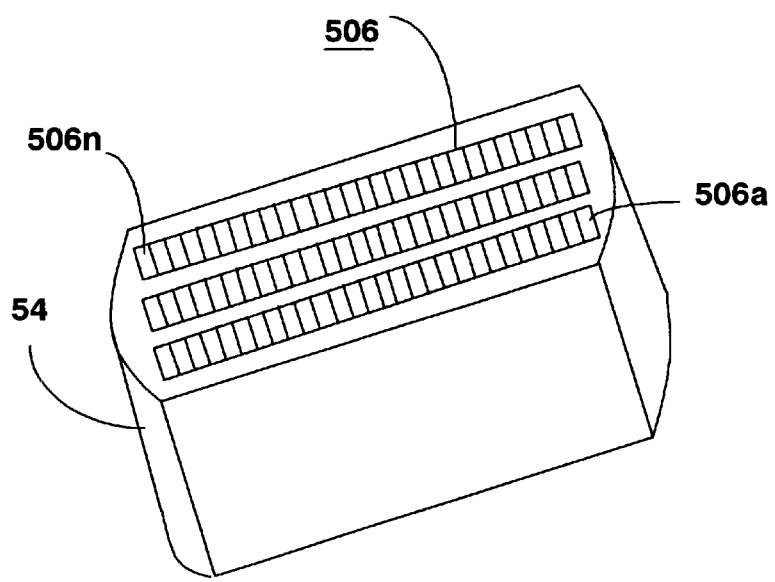

FIG. 7 shows an example of a thermal head equipped in the recording apparatus of optical recording medium shown in FIG. 6.

Figure 8:
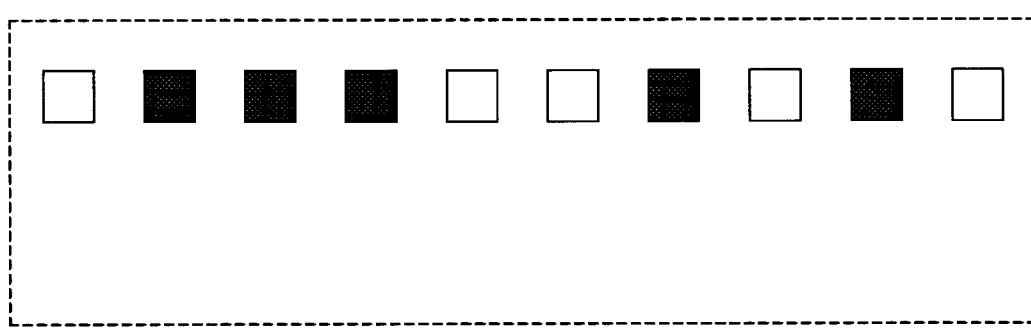

FIG. 8 shows an example of a method of a recording identification information inherent to an optical recording medium into array of CGHs.

Figure 9:
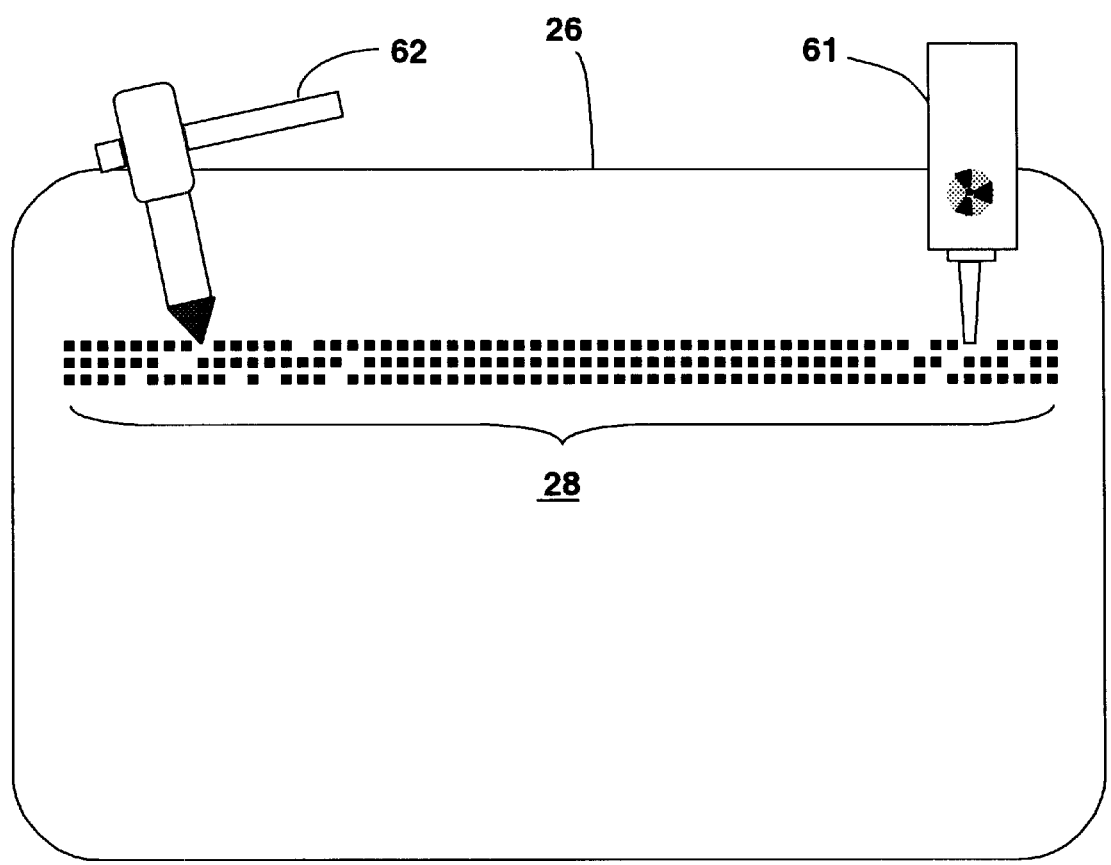

FIG. 9 shows a configuration of another recording apparatus for an optical recording medium, which records an identification signal in a data storage area of an optical recording medium.

Figure 10:
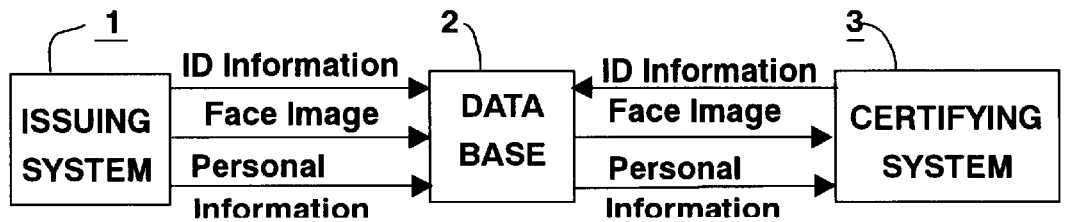

FIG. 10 shows a configuration of a total system including a system of issuing a card (card issuing system) and a system of certifying the card (card certifying system) showing flows of data and information among the systems according to the present invention.

Figure 11:
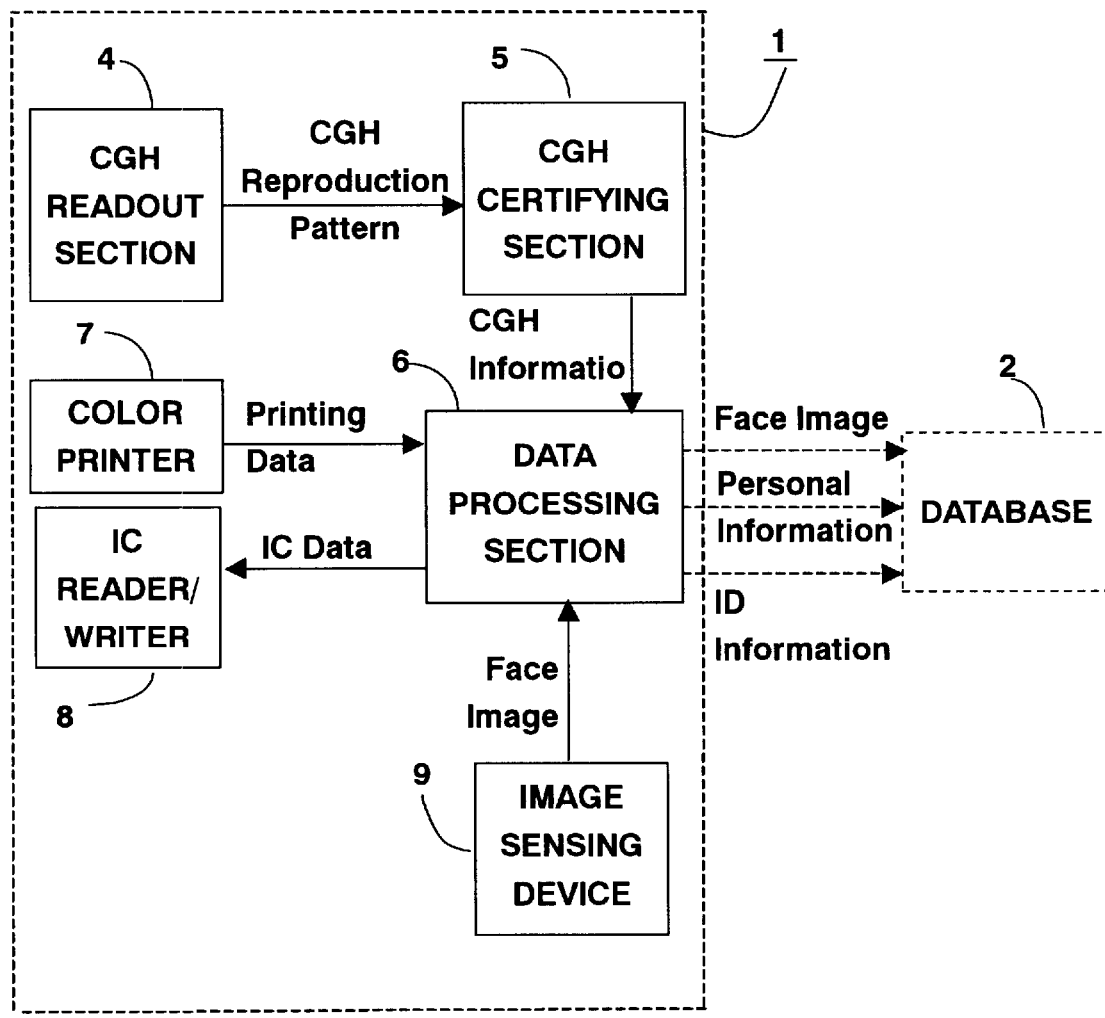

FIG. 11 is a block diagram showing a configuration of a card issuing system according to the first embodiment of the present invention.

Figure 12:
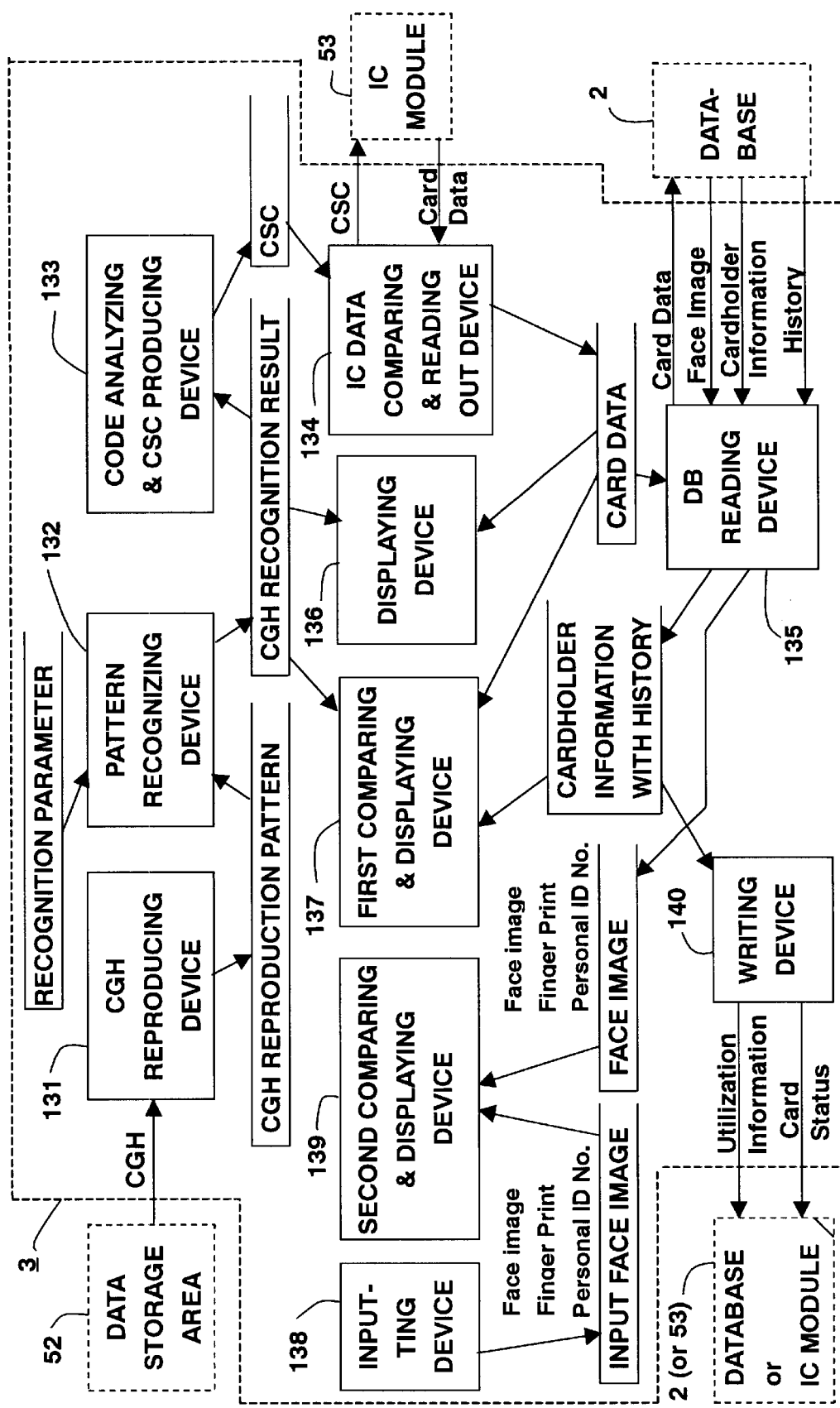

FIG. 12 is a block diagram of a card certifying system showing a total configuration of the system.

FIGS. 13(a) and 13(b) are data configuration of a data storage area 52 and a database 2 respectively utilized for a card certifying system according to the second embodiment of the present invention.

FIG. 14 shows a data configuration of a data storage area 52 of a personal ID card utilized for a card certifying system according to a third embodiment of the present invention.

FIGS. 15(a) and 15(b) show data configuration of a personal ID card 51 and a database 2 utilized for a card certifying system according to a fourth embodiment of the present invention.

DETAILED DESCRIPTION OF THE PREFERRED EMBODIMENTS

According to an aspect of the present invention, a system of issuing a card (card issuing system) issues a personal identification (ID) card, which is recorded with data such as a personal information and printed with information such as a face picture and a name of a person on a crude card, wherein the crude card is previously recorded with a card ID information inherent to each card by a plurality of holograms in a data recording area provided on the crude card. Further, the card issuing system also issues a personal ID card by utilizing another crude card as the same manner as mentioned above, wherein the crude card is equipped with an IC chip and/or a magnetic recording area in conjunction with the data recording area.

First Embodiment

First of all, a manufacturing method of a crude card is depicted. A plurality of computer generated holograms (CGHs) are produced on a substrate of each crude card so as to record a card ID information inherent to each crude card. Each CGH expresses a picture or a character as a hologram. An interference pattern of hologram is accurately drawn on a recording medium by an electron beam, which is radiated from an electron-beam exposure device driven by data of the CGH. A master plate for an optical recording medium to be mass-produced is manufactured by etching the recording medium. The plurality of CGHs is produced on a substrate of each crude card by a same manufacturing process as that of an optical disc.

Figure 1:
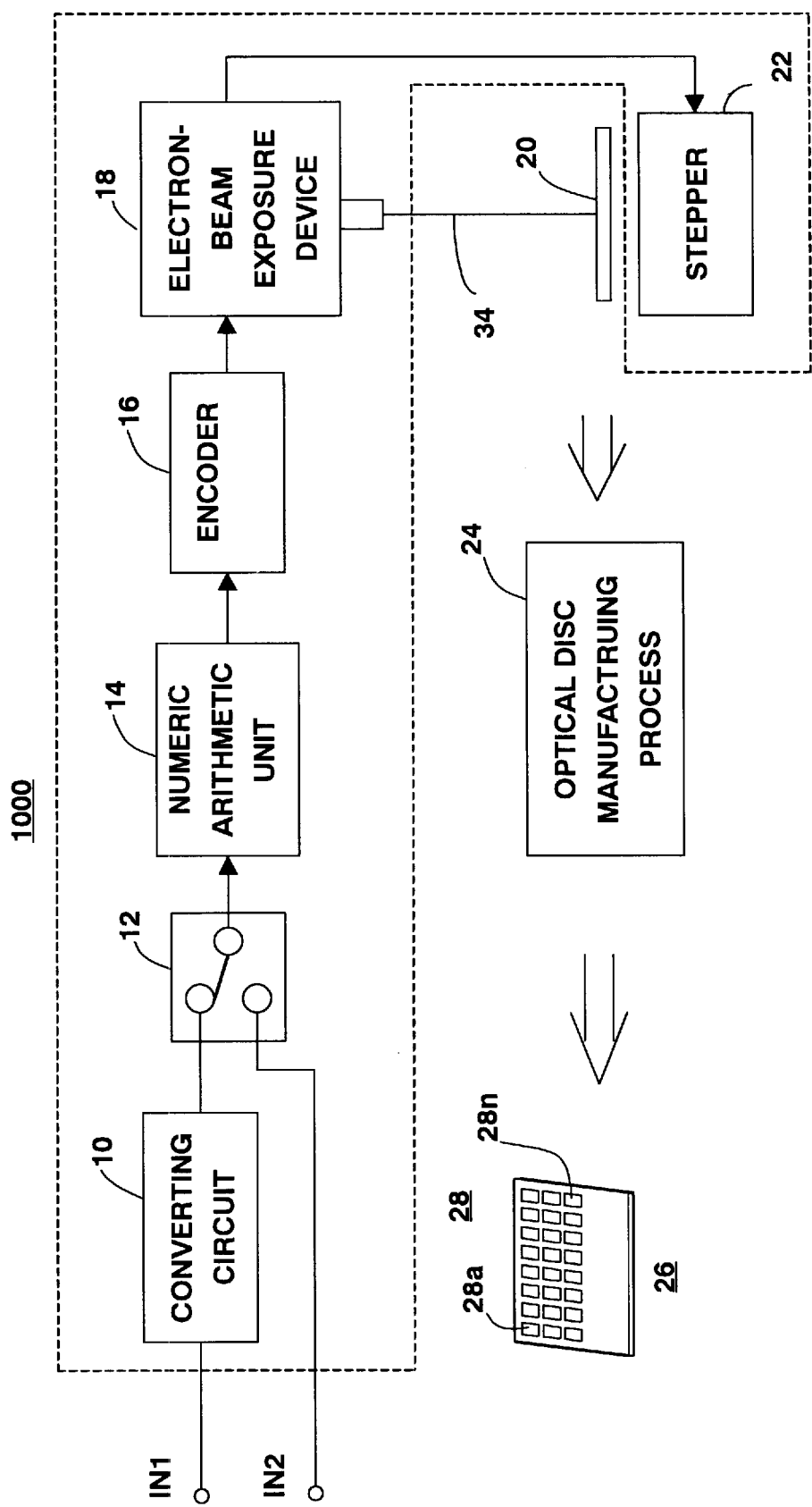
FIG. 1 is a block diagram exemplarily showing a method of producing a plurality of computer generated holograms (CGHs), which are provided on a card shaped optical recording medium, according to the present invention.

FIG. 1 is a block diagram exemplarily showing a method of producing a plurality of CGHs, which are provided on a crude card of a card shaped optical recording medium, according to the present invention.

Figure 2:
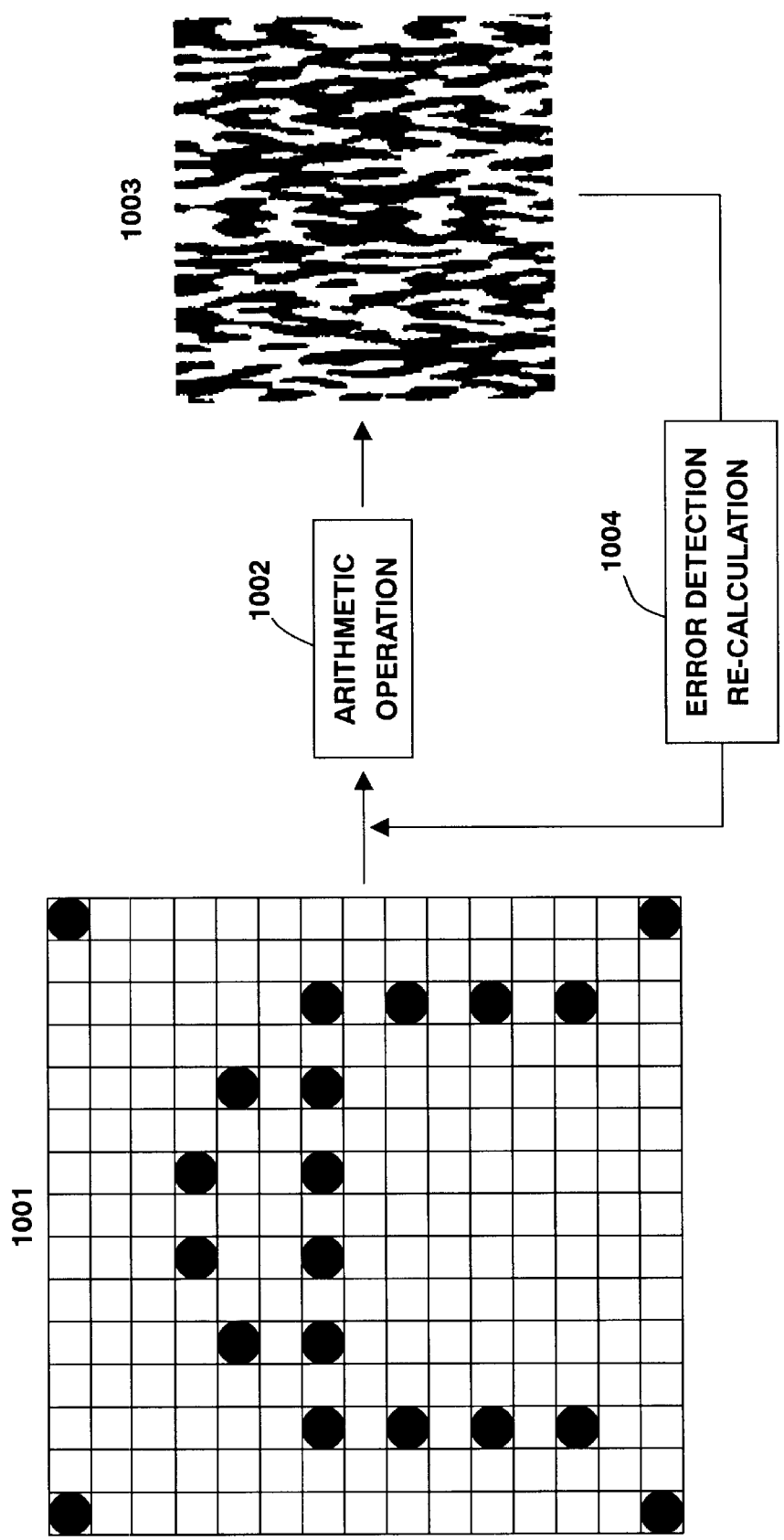
FIG. 2 shows a process of obtaining an interference pattern of a computer generated hologram from a two-dimensional picture.

FIG. 2 shows a process of obtaining an interference pattern of a computer generated hologram from a two-dimensional picture.

In FIG. 1, the method of producing a plurality of CGHs is composed of a processing apparatus 1000 and an optical disc manufacturing process 24. The processing apparatus 1000 comprises a converting circuit 10 for converting a character signal to an image signal, a switch (multiplexor) 12, a numerical arithmetic unit 14, an encoder 16, an electron-beam exposure device 18, a stepper (stage controller) 22 and two input terminals IN1 and IN2. Further, a primary recording medium 20 on the stepper 22 is irradiated by an electron beam 34 emitted from the electron-beam exposure device 18. The primary recording medium 20 is processed through the optical disc manufacturing process 24 and finally a crude card 26, which is utilized for a personal ID card as a card shaped optical recording medium, is produced. Accordingly, a plurality of CGHs 28 (28a through 28n) are provided and allocated on the crude card 26.

The method of producing a CGH is depicted hereinafter for the case that a character information is recorded into each CGH 28. As shown in FIG. 1, a character information signal supplied to the input terminal IN1 is inputted to the converting circuit 10. The converting circuit 10 converts the inputted character information signal, which is a character represented by a code information of a digital signal, into an image signal of dot pattern of a two dimensional picture. The image signal, which is depicted in FIG. 2 as an input data 1001, is supplied to the numerical arithmetic unit 14 through the multiplexor 12. The numerical arithmetic unit 14 obtains numerical values for obtaining an interference pattern of a hologram (holography interference figure) by a predetermined algorithm without radiating interference light from the image signal of dot pattern of the two dimensional picture.

In FIG. 2, the input data 1001, that is, the image signal of dot pattern of a two dimensional picture is converted into an output data 1003, that is, the holography interference figure through an arithmetic process 1002 performed by the numerical arithmetic unit 14 shown in FIG. 1. A computer, which can perform high-speed operation, is utilized for the numerical arithmetic unit 14. Deriving a holography interference figure, that is, a wave front shaped pattern from data of a two dimensional picture is known as a CGH (computer generated hologram).

Further, the numerical arithmetic unit 14 is constituted so as to output coordinates data corresponding to a resolution of the electron-beam exposure device 18, which is a drawing device. In addition thereto, the numerical arithmetic unit 14 compares the coordinates data (output data 1003) through the arithmetic process 1002 with the input data 1001 and re-calculates a plurality of times repeatedly so as to reduce an error between the input and output data 1001 and 1003 as shown in FIG. 2 (1004).

Referring back to FIG. 1, an output signal from the numerical arithmetic unit 14 is formed as a signal of predetermined format by the encoder 16 and the signal is supplied to the electron-beam exposure device 18. The electron-beam exposure device 18 is basically utilized for manufacturing an IC (integrated circuit) and an LSI (large scale integrated circuit) so as to draw a circuit pattern on a surface of a semiconductor substrate. However, according to the first embodiment of the present invention, the electron-beam exposure device 18 is utilized for drawing the holography interference figure (output data) 1003 shown in FIG. 2 on the primary recording medium 20. The primary recording medium 20 is named so as to be discriminated from the crude card 26, which is a final product of the method of producing a plurality of CGHs. With respect to the primary recording medium 20, a substrate such as a silicon wafer or a glass plate coated with photo-resist, which is a photosensitive resin as a medium to be exposed, is utilized.

The primary recording medium 20 is mounted on the stepper 22. The stepper 22 can move to two directions of X—Y axes on a plane, which is perpendicular to the electron beam 34, in accordance with a signal from the electron-beam exposure device 18. Since an electron beam can draw an extremely fine and minute pattern, drawing by an electron beam is more suitable for drawing a holography interference figure than drawing by a laser beam utilized for manufacturing an optical recording medium currently.

The primary recording medium 20 can be processed as a master photo-mask and the master photo-mask is utilized for manufacturing a plurality of secondary recording mediums by photo exposing process through the master photo-mask, and then the crude card 26 as a final product can be manufactured through the optical disc manufacturing process 24 by utilizing the secondary recording medium as a master stamper.

Figure 3A:
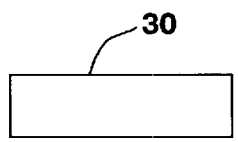
Figure 3B:
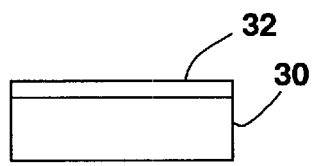
Figure 3C:
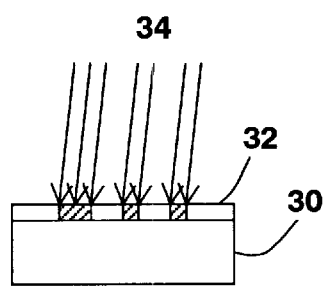
Figure 3D:
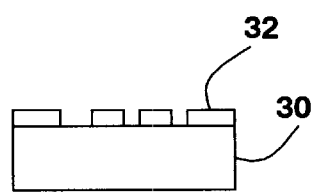
Figure 3E:
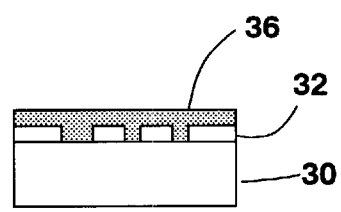
Figure 3F:
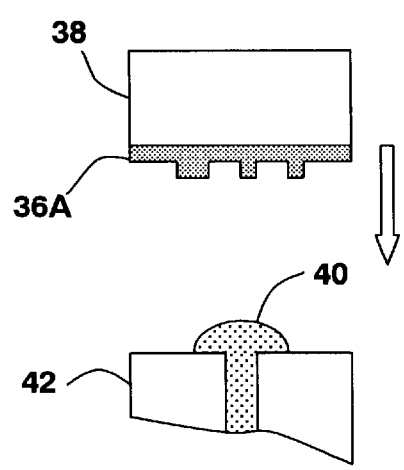
Figure 3G:
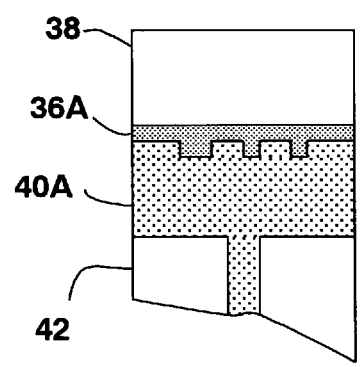

FIGS. 3(a) through 3(g) show each step of a process of producing a card shaped optical recording medium utilized for the present invention. In FIGS. 3(a) and 3(b), a substrate 30 such as a silicon wafer or a glass plate is coated with photo-resist 32. In FIG. 3(c), the photo-resist 32 is irradiated by the electron beam 34 emitted from the electron-beam exposure device 18 shown in FIG. 1. In FIG. 3(d), a part of photo-resist 32 irradiated by the electron beam 34 is removed by an etching process. In FIG. 3(e), a metal layer 36, which fills over a rugged surface of the photo-resist 30 etched, is formed by a plating process, and then the substrate 30 is removed. As shown in FIG. 3(f), the metal layer 36 removed from the substrate 30 is backed with a press material 38, which functions as a moving die plate, and utilized as a stamper 36A for an injection mold press. In FIG. 3(f), melted PC (polycarbonate) resin 40, which is major component of a primary recording medium and a crude card, is injected into a cavity of a injection molder through a gate of a press base 42, which functions as a stable die plate, and the stamper 36A approaches the melted PC resin 40. In FIG. 3(g), the melted PC resin 40 is molded and stamped by the stamper 36A during a pressing process, and then a main substrate 40A of a primary recording medium is formed with having a rugged surface in accordance with the rugged surface of the photo-resist 32. The rugged surface of the main substrate 40A is covered with a protective layer of aluminum, not shown, processed by an aluminum spattering process. Further, in a case of manufacturing large amounts of optical recording mediums, it is necessary to produce a plurality of stampers. In this case, a master disc is produced first instead of producing the stamper 36A in the steps shown in FIGS. 3(e) and 3(f), and then a plurality of stampers can be produced.

Referring back to FIG. 1 once again, with assuming that data composed of 300 alphabets including numeric characters are recorded into a personal ID card, data of character arrays inputted to the input terminal IN1 in series are sequentially converted to an image signal by the converting circuit 10. The image signal is processed by a numeric operation with a predetermined algorithm in the numeric arithmetic unit 14 and a holography interference figure is obtained. The holography interference figure is encoded to data of a predetermined format by the encoder 16 and supplied to the electron-beam exposure device 18. The electron beam 34 is deflected by the data and draws a certain pattern on the primary recording medium 20. In this case, the electron-beam exposure device 18 controls the stepper 22, so that the primary recording medium 20 moves toward two directions of X—Y axes on a plane, which is perpendicular to the electron beam 34 so as to allocate 300 CGHs 28 in 3 lines, that is, 100 CGHs per line. The primary recording medium 20 is removed from the stepper 22 when the 300 CGHs 28 are recorded. Accordingly, the crude card 26 as a final product can be obtained through the optical disc manufacturing process 24.

FIG. 4 is an enlarged plan view of the crude card 26 shown in FIG. 1. As shown in FIG. 4, a plurality of CGHs 28 (28a through 28n) are allocated in 3 lines. For example, each CGH is 250 $\mu$m square, that is, A=250 $\mu$m and a gap between adjoining CGHs is also 250 $\mu$m, that is, B=C=250 $\mu$m. According to an embodiment shown in FIG. 1 or FIG. 4, 300 CGHs 28 are provided on the crude card 26. However, more than 1000 CGHs can be provided on the crude card 26 by shrinking dimensions of each CGH and a gap between adjoining CGHs down to 100 $\mu$m or less. Accordingly, it is possible to record more data in a smaller area.

The case that a character signal is inputted to the input terminal IN1 shown in FIG. 1 is depicted above. However, it is also feasible that an image signal is inputted to the input terminal IN2. In a case of inputting an image signal to the input terminal IN2, the image signal is applied to the numeric arithmetic unit 14 through the multiplexor 12 and performed by the same arithmetic operation as that of mentioned above. Accordingly, data of a holography interference figure can be obtained. The data is drawn on the primary recording medium 20, and then the crude card 26 is obtained. An original picture can be reproduced when the crude card 26 is irradiated by a laser beam or like.

Recorded information such as a character and a picture on the crude card 26 and a personal ID card, which is finally produced through a process after the process producing the crude card 26 shown in FIG. 1, can be read out by utilizing a certain reading or reproducing apparatus. If the CGH 28 on the crude card 26 are irradiated by reference light such as a laser beam of coherent light while the crude card 26 is transferred to a predetermined direction, a two dimensional picture recorded originally is projected on the crude card 26. In other words, if the letter "A" (input data 1001) shown in FIG. 2 is recorded, the dot pattern of the "A" is projected in a predetermined position on the crude card 26. Accordingly, an original character information can be reproduced by taking the dot pattern projected with an image sensing device such as a CCD (charge coupled device) image sensing device and then by decoding.

A plurality of crude cards produced by one stamper 36A has a data storage area composed of a plurality of CGHs 28 in a same format. An ID signal, which can be utilized for identifying each crude card one by one, is recorded in the data storage area.

FIGS. 5(a) through 5(c) show each step of producing a personal ID card having an IC module or chip. In FIGS. 5(a) and 5(b), an IC module 53 is mounted on a crude card 26 having a plurality of CGHs 28 or a data storage area 52, and then IC data of the IC module 53 is initialized. As shown in FIG. 5(c), a personal information such as a person's name, a face picture and other necessary information are printed in respective areas 501 and 502 on either surface of the card by a card issuing system in a card issuing office, and then a personal ID card 51 is produced.

A printing process mentioned above can be eliminated. However, since a substrate of the crude card 26 is made from transparent polycarbonate resin, printing any color including white on a surface of the crude card improves its appearance and is effective for increasing visual appeal of a picture, which is printed when it is issued. Further, the data storage area 52 must be kept transparent so as to maintain optical transparency. In other words, no color must be printed on the surface of the data storage area 52 when a color is printed on the surface of the card. In addition thereto, an area in which the IC module 53 is mounted must be freed from printing not so as to be insulated by the printing. In a case of an offset printing, the area provided for the IC module 53 must be countersunk not so as to be printed. Accordingly, the area can be prevented from being insulated.

Polycarbonate resin mixed with a white pigment, for example, can be utilized for a substrate of the crude card 26. In this case, in order to enable to read the data storage area 52 optically, the CGH 28 is formed on the surface of the data storage area 52 and is constituted as a reflection type CGH by spattering metal such as aluminum over the CGH 28, so that a reflection film is produced over the CGH 28. Since the reflection film is extremely thin in comparison with level difference of a blaze composing reproduction data of the CGH 28, a shape of the blaze appears on the reflection film. Accordingly, data recorded in the data storage area 52 can be read out by irradiating monochromatic light to the surface of or the reflection film on such the reflection type CGH. Further, in case of printing a picture on the crude card 26 while issuing the personal ID card 51, the data storage area 52 shall not be printed so as to maintain optical transparency to the reflection type CGH.

FIG. 6 shows a configuration of a recording apparatus for an optical recording medium, which records an identification signal in a data storage area of an optical recording medium according to the first embodiment of the present invention.

FIG. 7 shows an example of a thermal head equipped in the recording apparatus shown in FIG. 6 for an optical recording medium. As shown in FIG. 7, a thermal head 54 comprises a plurality of heat elements 506 (506a through 506n). The heat element 506a is a head of array of the heat elements 506.

In FIG. 6, the recording apparatus comprises a CCD 50 as an image sensing device, a thermal head 54, a laser emission device 56, that is, a monochromatic light emission device and a half mirror 58. The crude card 26 is conveyed horizontally to a predetermined writing position by an optical card carrier not shown and ejected by driving the card to a direction opposite to a loading direction when the crude card 26 is recorded completely, wherein recording is performed by demolishing some of the CGHs 28 at a heating point 504 in accordance with an output signal from the CCD 50.

Optical axes of the laser emission device 56 and the CCD 50 almost intersect perpendicularly to each other. Further, a plane including these optical axes is disposed to be approximately perpendicular to the surface of the data storage area 52 of the crude card 26. Furthermore, the plane is disposed to be approximately parallel to the direction of conveying the crude card 26 by the optical card carrier not shown. In addition thereto, the thermal head 54 and the CCD 50 are disposed such that the data storage area 52 of the crude card 26, an axis of writing direction of the thermal head 54 and the optical axis of the CCD 50 are aligned with almost a same axis when the crude card 26 is loaded into the predetermined writing position.

Since it is necessary for an ID information to be recorded by coinciding the heat generating position 504 of the thermal head 54 with the data storage area 52, the ID information is recorded by confirming a location of the CGH 28 by utilizing an output signal of the CCD 50, which receives reflected light from the laser beam. If a pitch between adjoining heat elements 506 is equal to that of the CGH 28 and further a quantity of heat elements 506 is a same as that of the CGH 28, controlling while recording is effectively simplified. In a case of recording into a plurality of CGHs 28 at a same time, the CGHs 28 can be recorded in an extremely short time as far as a heat element facing toward a desired CGH is heated by coinciding a head of the CGHs 28 with an irradiating position of the laser beam from the laser emission device 56. Accordingly, some of the CGHs 28 are demolished so as to record individual ID information inherent to each crude card 26, and then a protection film is formed over the CGH 28 or the data storage area 52.

FIG. 8 shows an example of a method of recording an ID information inherent to each optical recording medium or a personal ID card 51 into an array of CGHs 28. The ID information is utilized for identifying each personal ID card 51 one by one. Recording information into an array of CGHs 28 is demolishing a predetermined number of CGHs 28 so as to acquire a meaning by a location of CGH demolished or that of not demolished.

Demolishing a given CGH at a certain location is decided by the combinations. In a case of a demolishing combination where 5 CGHs, for example, out of 10 CGHs shall be demolished as shown in FIG. 8, it acquires that the combinations of 10 taken 5 at a time equals 252, that is, the demolish combinations has $_{10}C_5=252$ meanings. In this case, a number of CGHs demolished and that of not demolished are always 5 each in any combinations. Accordingly, in a case that some CGHs not demolished are demolished so as to rewrite a combination for counterfeiting a personal ID card, data indicated by the CGH 28 meaningless because total number of CGHs not demolished is less than 5. Since the CGH 28 is a nonvolatile memory and it can not be restored any more once demolished, it is impossible to rewrite information once recorded in a CGH. If information recorded in a CGH is restored, it takes a complicated method or system such as replicating the CGH by some method and analyzing a content of the CGH. Accordingly, recording information into an array of the CGHs 28 is extremely effective method for preventing illegal fabrication.

In a case of one line of the CGHs 28 having 30 CGHs or a plurality of lines of the CGHs 28 having 30 CGHs per line, the combinations of the CGHs 28 is $_{30}C_{15}=155,117,520$. Further, in a case of 50 CGHs per line, the combinations is $_{50}C_{25}$=approximately 126 trillion.

FIG. 10 shows a configuration of a total system including a card issuing system and a card certifying system showing flows of data and information among the systems according to the present invention.

In FIG. 10, a card issuing system 1 prints visually a face picture of a person and a name of the person on the crude card 26, which is already recorded with ID information data inherent to each card in the data storage area 52, in conjunction with recording personal information such as information about the face picture, the name of the person, sex, date of birth and blood type. In a case that the personal information and the information about the face picture are registered in the card issuing system 1, those contents are also registered in a database 2. In a case of utilizing a personal information, which are already registered in the database 2, the information is transferred from the database 2 to the card issuing system 1. In anycase, ID information recorded in the data storage area 52 of the crude card 26 is read out by the card issuing system 1 and stored in the database 2. The ID information is registered in the database 2 in response to a personal information.

Corresponding to the card issuing system 1, a card certifying system 3 transmits card information including an ID to the database 2 and the database 2 transmits a personal information corresponding to the ID information to the card certifying system 3, so that the card certifying system 3 can certify one personal ID card 51 including the ID information. In addition thereto, the card certifying system 3 can certify the personal ID card 51 issued by the card issuing system 1 without utilizing the database 2, if all of necessary personal information are recorded in the personal ID card 51 totally.

FIG. 11 is a block diagram showing a configuration of the card issuing system 1 shown in FIG. 10.

As shown in FIG. 11, the card issuing system 1 comprises a CGH readout section 4, a CGH certifying section 5, a data processing section 6, a color printer 7, an IC reader/writer 8 and an image sensing device 9 such as a digital camera. First of all, an image formed in the data storage area 52 of the crude card 26 is reproduced in the CGH readout section 4. In other words, an image of the CGH 28 can be reproduced as follows: irradiate monochromatic light emitted form a semiconductor laser emission device on each CGH 28 sequentially or at a same time and receive a pattern, which is projected by primary diffraction light diffracted by each CGH 28 in response to the monochromatic light, by using a light receptor or an image sensing device such as a CCD. Data of the CGH reproduction pattern, which are processed photoelectric conversion by the CCD, are supplied to the CGH certifying section 5.

The CGH certifying section 5 obtains information about the crude card 26 whether it is a genuine or a fake, an ID information and a permission information of the IC module 53 if necessary by utilizing a character and a picture shown by the reproduced image inputted and a location, which can not be reproduced because of a CGH being demolished. Accordingly, in a case that the crude card 26 is a genuine card, a CGH information such as the ID information and the permission information are supplied to the data processing section 6.

In the data processing section 6, a personal information such as a name of a person, who will posses the personal ID card, sex, date of birth and a blood type are inputted, and also an image of the person's face and finger prints, which are taken by the image sensing device 9 such as a digital camera and a scanner, are inputted, and then these data are registered into the database 2 in response to the ID information. In a case that the IC module 53 is mounted on the crude card 26, the data processing section 6 makes access to the IC module 53 by means of the permission information stored in the IC module 53 and outputs to the IC reader/writer 8 a part of or all of a reference information of the database 2, an ID information of the card or a personal information, and then the information is written into the IC module 53. Further, a part of the personal information, for example, a person's name and a face picture are outputted to the color printer 7 or a card printer and printed on the surface of the crude card 26. Accordingly, the personal ID card 51 can be issued after a protection film is formed over the crude card 26.

Printing the personal information and forming the protection film on the surface of the crude card 26 shall be performed at least with keeping the data storage area 52 transparent so as to maintain the area in optical transparency, in other words, no color shall be printed on the area. Further, an area in which the IC module 53 is mounted shall not be insulated. Furthermore, in a case that a magnetic recording area is provided instead of the IC module 53 or additionally, the area shall be kept transparent and not be insulated as the same manner as mentioned above, and then the personal ID card 51 can be issued.

Accordingly, the card issuing system 1 can be feasible by combining all sections and devices shown in FIG. 11 in one or with comprising them individually. In addition thereto, combining the CGH readout section 4 with the color printer 7 is a most effective configuration because the personal ID card 51 can be issued without taking out the crude card 26 during the process.

While the invention has been described above with reference to specific embodiment and method thereof, it is apparent that many changes, modifications and variations in the arrangement of equipment and devices can be made without departing from the invention concept disclosed herein. For example, FIG. 9 shows a configuration of another recording apparatus for an optical recording medium, which records an ID signal in a data storage area of an optical recording medium according to the embodiment of the present invention. In FIG. 9, a laser beam emitted from a YAG, excimer or $CO_2$ laser emission device 61 or an impact hammer 62 is utilized for recording information in the CGH instead of the thermal head 54. The laser beam records information by melting down CGH 28 or removing a metal reflection film of the CGH 28. The impact hammer 62 demolishes a CGH physically. The method of recording information by the impact hammer is disclosed in the Japanese Patent Laid-open Publication No. 11-120299/1999. In a case of demolishing a CGH by the thermal head 54, a protection film must be formed after the CGH is demolished. However, in a case of demolishing a CGH by the laser beam emitted by the laser emission device 61 or the impact hammer 62, demolishing can be performed after a protection film is formed over the CGH and even though the crude card is printed. Particularly, in a case that a personal information of a customer is recorded by a facility in a card issuing office or store, it must be considered that a crude card formed by a protection film is processed. Accordingly, a card issuing system provided with a recording method by an impact hammer is desirable.

Since recording data into a CGH of a crude card by utilizing the thermal head 54, the laser beam emitted by the laser emission device 61 or the impact hammer 62 is performed in a previous stage of issuing a personal ID card, that is, when manufacturing the crude card, a recording facility itself can be installed in a factory. Accordingly, a reproduction apparatus for an optical recording medium, which can just read out CGH and is not provided with a recording capability, can be installed in an office or a store of issuing or certifying a personal ID card. However, in a case of a card issuing system, which additionally records information into a second recording area provided in the data storage area 52 having a plurality of CGHs 28, it is necessary for the card issuing office to enable to record data into the second recording area. In this case, the card issuing office can only make access to a first recording area, which is an area recorded with an ID information and can not record into the first recording area.

In a case that a personal information including a face image are registered in the database 2, although the first embodiment of the present invention discloses that the personal information is inputted in the card issuing system 1, a personal ID card can be issued by utilizing the personal information. In FIG. 11, the data processing section 6 transmits information, which is information specifying a card holder or an access key information, in order to make access to a personal information stored in the database 2, and transmits the ID information of the crude card 26 to the database 2 in conjunction with obtaining a personal information and a face image information, and then registers the ID information correlated with the personal information. The personal ID card can be issued by outputting the personal information and the face image information obtained from the database 2 to the color printer 7 and the IC reader/writer 8 as a printing data and an IC data.

It is also possible to alter an input route of information such that only a face image information is inputted from the card issuing system 1 and the other personal information are obtained from the database 2. Further, contents of the personal information, which are recorded into the IC module 53 or printed on a card, can be altered.

Furthermore, a personal ID card provided with only the data storage area 52 having CGH 28 and without an IC module or a magnetic recording area can be feasible. In this case, a personal information is recorded in the database 2 and the personal information can be made access by an ID information recorded in the data storage area 52. In addition thereto, the data storage area 52 is divided into two areas a first recording area recorded with an ID information and a second recording area, which can be recorded additionally, and then a personal information, a face image information and a finger print image information can be recorded additionally into the second recording area by erasing a part of a plurality of holograms included in the second recording area. In this case, since information once recorded can not be rewritten, additional recording of new data and deleting can be performed.

It is also feasible that recording into the IC module 53 in conjunction with recording into the second recording area of the data storage area 52 as mentioned above.

It is another application of recording information into a crude card that a personal ID card can comprise the IC module 53 and the data storage area 52 composed of a plurality of CGHs. In this case, an ID information of the card and a personal information can be recorded into the IC module 53.

In a case that a face and a finger print image information are recorded additionally into the second recording area of the data storage area 52 and the IC module 53, it can be sufficiently recorded that original data such as a picture data itself shall be suppressed into low capacity data such as data of plotting out features of a face and a finger print.

Second Embodiment

According to the aspect of the present invention, there provided a system of certifying a card (card certifying system), which certifies a card whether it is a genuine or a fake and further can display a personal information recorded in the card if necessary, when the card such as a card shaped optical recording medium shown in FIG. 5(c) is utilized for a personal identification (ID) card 51. The personal ID card 51 shown in FIG. 5(c) comprises the data storage area 52, which is recorded with a card ID or an ID information inherent to each card by means of a plurality of CGHs (computer generated hologram) 28, a face picture area 502 in which a face picture of a card holder is printed, an information printing area 501 in which a personal information such as a name of the card holder is printed and an IC module 53, and/or a magnetic recording area if necessary.

In addition thereto, an ID information recorded in the data storage area 52 includes a content inherent to each card and is recorded by demolishing a predetermined number of CGHs out of the plurality of CGHs provided in the data storage area 52, so that the ID information can not be rewritten.

FIG. 12 is a block diagram of a card certifying system showing a total configuration of the system.

In FIG. 12, the card certifying system 3 comprises a CGH reproducing device 131, a pattern recognizing device 132, a code analyzing and access code (CSC) producing device 133, an IC data comparing and reading out device 134 (second reading out device), a database (DB) reading device 135, a displaying device 136 for recognized result of CGH, a first comparing and displaying device 137 for CGH and IC and a DB information, an inputting device 138 for information such as an image information, a second comparing and displaying device 139 for an image information and a writing device 140 for a history of certifying the card and a status of the card.

The CGH reproducing device 131 outputs a reproduced image of CGH from the data storage area 52 of the personal ID card 51 after obtaining the CGH reproduction pattern taken by an image sensing device such as a CCD allocated at a focal point of diffraction light, which is generated by irradiating a monochromatic light on each CGH. The CGH reproduction pattern is supplied to the pattern recognizing device 132 and compared with a previously stored a reproduction positioning information or a fundamental positioning information and a content of the reproduction pattern, that is, a recognition parameter, and finally the content is recognized.

Further, in a case that an access key or a permission information to the IC module is included in the CGH recognition result, the permission information is supplied to the code analyzing & CSC producing device 133 and an access code (CSC) to the IC module 53 is produced. The CSC is supplied to the IC data comparing and reading out device 134. The IC data comparing and reading out device 134 reads out information or a card data recorded in the IC module 53 on the personal ID card 51 and supplies the card data to the displaying device 136 so as to display the card data.

The DB reading device 135 makes access to the database 2 by utilizing the ID information included in the CGH recognition result and a reference information of DB recorded in the IC module 53 as a card data and reads out a card holder information or a personal information and a card ID information registered in the database 2. The first comparing and displaying device 137 compares the card ID information with the card data outputted from the IC data comparing and reading out device 134 and the CGH recognition result outputted from the pattern recognizing device 132 and displays a result of reference. It is also feasible that the first comparing and displaying device 137 compares only a part of a personal information.

Furthermore, in a case of certifying a card holder in addition to certifying a personal ID card, the inputting device 138 such as a video camera, a digital camera, a finger print detector and a key board entry device takes a face picture and a finger print of the card holder and inputs a personal ID number or like of the card holder, and transfers these information to the second comparing and displaying device 139. The second comparing and displaying device 139 compares those information transferred from the inputting device 138 with a face image, a finger print information and a personal ID number recorded in the database 2 and the IC module 53 and certifies the card holder and displays the result of certification. With respect to comparing of a face picture and a finger print information, it is acceptable to judge similarity of a face picture or a finger print picture itself, or to compare features extracted from a face and finger print pictures with features already extracted and stored in the database 2. In addition there to, it is also acceptable that a face image and a finger print information from the inputting device 138 and a face image and a finger print information recorded in the database 2 are outputted to the second comparing and displaying device 139, and an operator of the system judges those images and information, and then certifies the card holder.

In a case of recording a history of certification and a card status into the database 2 and the IC module 53, the writing device 140 writes this information into the database 2 and/or the IC module 53.

FIGS. 13(*a*) and 13(*b*) are data configuration of a data storage area 52 and a database 2 respectively utilized for a card certifying system according to the second embodiment of the present invention.

According to another aspect of the present invention, there provided a system of certifying a card (card certifying system), which reads out and displays a personal information registered in the database 2 by utilizing an ID information recorded in the data storage area 52 of the personal ID card 51. As shown in FIG. 13(*a*), the data storage area 52 can be recorded with only an ID information, which can not be rewritten. A personal information is registered in the database 2 as well as an ID information, as shown in FIG. 13(*b*), in response to the ID information recorded in the data storage area 52. Further, a personal ID card without an IC module or a magnetic recording area can also be applicable for a component of a card certifying system.

With referring to FIG. 12, when the personal ID card 51 is certified, by utilizing an ID information obtained from the CGH reproducing device 131 and the pattern recognizing device 132, the DB reading device 135 makes access to the database 2 and reads out information such as a personal information, and then outputs a card holder information with a history to the first comparing and displaying device 137, wherein the ID information is compared with a common factor of 3 information of CGH and IC and DB. If the pattern recognizing device 132 judges that the ID information is counterfeited or it can not be reproduced, or that there existed information not coincide with the personal information by comparing process, such information as mentioned above is displayed on the first comparing and displaying device 137. Such the personal ID card 51 judged as defective can be collected by a collection device, not shown.

Third Embodiment

FIG. 14 shows a data configuration of a data storage area 52 of a personal ID card utilized for a card certifying system according to a third embodiment of the present invention.

According to further aspect of the present invention, there provided a system of certifying a card (card certifying system), which reads out information from a data storage area 52 of a personal ID card 51 and displays the information. In FIG. 14, the data storage area 52 is divided into two areas; a first recording area 52*a* and a second recording area 52*b*. As shown in FIG. 14, an ID information, which is disabled to rewrite, is recorded in the first recording area 52*a* and a personal information, which is only enabled to add and delete, is recorded in the second recording area 52*b*. With referring to FIGS. 12 and 14, since both the ID information and the personal information are recorded in the data storage area 52, the card certifying system can certify the personal ID card 51 by the system itself without making access to the database 2. Further, a personal ID card without an IC module or a magnetic recording area can also be applicable for a component of a card certifying system.

While certifying the personal ID card 51, in a case that a CGH reproduction pattern obtained from the CGH reproducing device 131 is supplied to the pattern recognizing device 132 and an ID information is judged as genuine, information. such as a personal information are outputted to the displaying device 136 and displayed. In a case of being judged such that a genuine ID information can not be obtained or a recognition information can not be reproduced, information indicating a recognition result is displayed by the displaying device 136. Such the personal ID card 51 recognized as mentioned above can be collected by a collection device not shown.

Fourth Embodiment

FIGS. 15(*a*) and 15(*b*) show data configuration of a personal ID card 51 and a database 2 utilized for a card certifying system according to a fourth embodiment of the present invention.

According to furthermore aspect of the present invention, there provided a system of certifying a card (card certifying system), which reads out an ID information recorded in an IC module 53 by utilizing a permission information recorded in a data storage area 52 of a personal ID card 51, and reads out a personal information registered in the database 2 if the ID information recorded in the IC module 53 is coincide with an ID information recorded in the data storage area 52 and displays the personal information. In FIG. 15(a), a personal ID card comprises a data storage area 52 and an IC module 53. As shown in FIG. 15(a), an ID information, which is disabled to rewrite, and a permission information, which is disabled to rewrite, are recorded in the data storage area 52 or a first data storage area, and an ID information and a database reference information are recorded in the IC module 53 or a second data storage area. Further, as shown in FIG. 15(b), a personal information corresponding to the ID information is registered in the database 2, wherein the personal information is formatted so as to be referred by a database reference information. The IC module 53 can be read out and written only by utilizing the permission information recorded in the data storage area 52.

With referring FIGS. 12, 15(a) and 15(b), when certifying the personal ID card 51, a permission information and an ID information recorded in the data storage area 52 or the first data storage area are read out by the CGH reproducing device 131 and the pattern recognizing device 132 or a first reading out device and an access code (CSC) making access to the IC module 53 or the second data storage area is produced by supplying the permission information to the code analyzing & CSC producing device 133. The CSC is supplied to the IC data comparing and reading out device 134 or a second reading out device and an ID information recorded in the IC module 53 of the personal ID card is read out. The DB reading device 135 reads out information such as a personal information with making access to the database 2 by utilizing a database referring information only when the ID information read out from the data storage area 52 (first data storage area) is coincide with an ID information read out from the IC module 53 (second data storage area), and outputs the ID information to the displaying device 136. In a case of being recognized by the pattern recognizing device 132 (first reading out device) that the ID information is counterfeited or the recognition information can not be reproduced, at this moment, or recognized that the ID information read out from the data storage area 52 (first data storage area) is not coincide with an ID data read out from the IC module 53 (second data storage area), the displaying device 136 displays a result of recognition such that the personal ID card 51 is counterfeited or the DB reading device 135 can not make access to the database 2. Accordingly, the DB reading device 135 stops making access to the database 2 or transmits a notice such as an illegal card to the database 2. Further, in a case that information read out from the IC module 53 (second data storage area) are not coincide with information registered in the database 2 or an ID information obtained by the pattern recognizing device 132 (first reading out device) is not coincide with an ID information registered in the database 2, information indicating a result of recognition is displayed in the first comparing and displaying device 137.

Furthermore, in a case that an ID information and a personal information are recorded in the IC module 53 (second data storage area), a personal ID card can be certified without utilizing the database 2. In other words, a permission information and an ID information are read out by the CGH reproducing device 131 and the pattern recognizing device 132 (first reading out device) and a CSC of making access to the IC module 53 (second data storage area) is produced by supplying the permission information to the code analyzing and CSC producing device 133. Accordingly, an ID information recorded in the IC module 53 (second data storage area) of the personal ID card 51 is read out by supplying the permission information to the IC data comparing and reading out device 134 (second reading out device).

The IC data comparing and reading out device 134 (second reading out device) reads out a personal information or like from the IC module 53 (second data storage area) and outputs to the displaying device 136, only when the ID information read out from the data storage area 52 (first data storage area) coincide with an ID information read out from the IC module 53 (second data storage area). In a case of being recognized by the pattern recognizing device 132 (first reading out device) that the ID information is counterfeited or the recognition information can not be reproduced, at this moment, or recognized that the ID information read out from the data storage area 52 (first data storage area) is not coincide with an ID data read out from the IC module 53 (second data storage area), the first comparing and displaying device 137 displays a result of recognition such that the personal ID card 51 is counterfeited or the DB reading device 135 can not make access to the database 2. Accordingly, a personal information recorded in the IC module 53 (second data storage area) is not displayed. In this case, the IC module 53 (second data storage area) can be recorded with information such that the personal card is counterfeited.

In addition thereto, as another certifying method of the personal ID card 51, it is also feasible that a permission information and an ID information are recorded in the data storage area 52 (first data storage area) and only a database referring information is recorded in the IC module 53 (second data storage area). In this case, the CGH reproducing device 131 and the pattern recognizing device 132 (first reading out device) read out a permission information and an ID information recorded in the data storage area 52 (first data storage area). The permission information is supplied to the code analyzing and CSC producing device 133. The code analyzing and CSC producing device 133 produces a CSC of making access to the IC module 53 (second data storage area) and the CSC is supplied to the IC data comparing and reading out device 134 (second reading out device), and then a database referring information recorded in the IC module 53 (second data storage area) of the personal ID card 51 is read out. The DB reading device 135 makes access to the IC module 53 (second data storage area) by utilizing the database referring information and reads out the ID information and the personal information or like from the IC module 53 (second data storage area), and then result of recognition is outputted to the displaying device 136 so as to display. In a case of being recognized by the pattern recognizing device 132 (first reading out device) that the ID information is counterfeited or the recognition information can not be reproduced, at this moment, or recognized that the ID information read out from the data storage area 52 (first data storage area) is not coincide with an ID data read out from the IC module 53 (second data storage area), the first comparing and displaying device 137 displays a result of recognition such that the personal ID card 51 is counterfeited or the DB reading device 135 can not make access to the database 2. Accordingly, the personal information recorded in the database 2 is not displayed. In this case, the IC module 53 (second data storage area) can be recorded with information such that the personal ID card is counterfeited.

While the invention has been described above with reference to specific embodiment and method thereof, it is apparent that many changes, modifications and variations in the arrangement of equipment and devices can be made without departing from the invention concept disclosed herein. For example, in the embodiments of the present invention explained above, by providing an access information storage section in the data storage area (first data storage area) 52, the IC module (second data storage area) 53 or the database 2, an access history information such as a number of certification, a date of certification, a location of certification and a content of certification of a personal ID card 51 can be recorded. Further, in a case of recording in the IC module 53 (second data storage area) or the database 2, the access history information can be recorded by the first comparing and displaying device 137.

Furthermore, in a case of certifying whether or not a card holder of the personal ID card is a proper card holder, a face and a finger print information of the card holder are inputted into the input device 138 on a spot and compared with a face or finger print information such as a face or a finger print image or features data of face or a finger print as a part of a personal information recorded in the IC module 53 (second data storage area) or in the data storage area 52 (first data storage area). The second comparing and displaying device 139 compares both image pictures and judges whether or not the cardholder is a proper one. In a case of being confirmed that the card holder is the proper one by a result of comparing or the second comparing and displaying device 139, a personal information can be displayed. It is also feasible that a face or a finger print information as a part of a personal information recorded in the database 2, the IC module 53 (second data storage area) or the data storage area 52 (first data storage area) are pictured and displayed in the second comparing and displaying device 139. In this case, an operator of the system can recognize whether or not the card holder is a proper one by comparing the face or the finger print of the card holder with the displayed face or finger print information.

In addition thereto, a card certifying system can also be feasible by providing a magnetic recording area instead of the IC module 53 or in addition to the IC module 53. In a case that a magnetic recording area is provided in the third embodiment of the present invention, an ID information to be recorded in the magnetic recording area shall be ciphered and a decoding key is recorded in the data storage area 52 as a permission information.

According to the aspect of the present invention, there provided a card issuing system, which issues a personal ID card utilizing an irreversible hologram. Therefore, the personal ID card is highly secured and hard to counterfeit.

According to another aspect of the present invention, there provided a card certifying system, which can recognize a card shaped optical recording medium having a computer generated hologram (CGH) in high security surely and simply whether or not it is a proper card. Further, the card certifying system can confirm that the card is surely utilized by a proper cardholder.

Accordingly, a personal ID card issued by the card issuing system in accordance with the present invention is a highly reliable card, so that the card can be applicable for an administration card, an entry and exit card, an employee card and an expensive ticket.

What is claimed is:

1. A card issuing system of issuing a card-shaped optical recording medium having a plurality of independent holograms, comprising:

a means for demolishing a predetermined number of holograms;

a means for irradiating monochromatic light on each of said holograms;

a means for taking a picture image that is reproduced from each of said holograms, which are irradiated with said monochromatic light;

a means for recognizing said reproduced picture image that is taken by said means for taking a picture image;

a means for producing an identification (ID) information that is used for identifying said card-shaped optical recording medium by combining each of picture images, which are recognized by said means for recognizing;

a means for inputting a personal information of an owner of said card-shaped optical recording medium in relation to a personal picture image of said owner of said card-shaped optical recording medium;

a means for registering said inputted personal information and picture image in a database in relation to said ID information; and a means for printing at least a part of either one of said personal information and picture image registered in said database on a surface of said card-shaped optical recording medium.

2. The card issuing system in accordance with claim 1, wherein said personal information is name, sex, date of birth and blood type of said owner of said card-shaped optical recording medium, and said personal picture image is a face and a fingerprint of said owner of said card-shaped optical recording medium.

3. The card issuing system in accordance with claim 1, wherein said card issuing system is further characterized in that said ID information, which is produced from said hologram by said means for producing an ID information, is registered in said database in relation to said personal information, which is previously or newly registered in said database.

4. The card issuing system in accordance with claim 1, wherein said card-shaped optical recording medium comprises a data storage area that is formed with a hologram, which outputs a predetermined reproduction pattern when irradiated with monochromatic light, said card issuing system is futher characterized in that a picture image is printed on an area other than said data storage area on a surface of said card-shaped optical recording medium while a surface of said data storage area is kept transparent.

5. The card certifying system in accordance with claim 4, wherein said data storage area further includes a personal information.

6. The card certifying system in accordance with claim 4, wherein a storage section for access information is provided in an area of said data storage area and in a recording area for personal information that is provided in said database.

7. A card issuing system of issuing a card-shaped optical recording medium, which comprises a first recording area having a plurality of independent holograms, and a second recording area that is rewritable, said card issuing system comprising:

a means for demolishing a predetermined number of holograms;

a means for irradiating monochromatic light on each of said holograms;

a means for taking a picture image that is reproduced from each of said holograms, which are irradiated with said monochromatic light;

a means for recognizing said reproduced picture image that is taken by said means for taking a picture image;

a means for producing an identification (ID) information that is used for identifying said card-shaped optical recording medium by combining each of picture images, which are recognized by said means for recognizing;

a means for inputting a personal information of owner of said card-shaped optical recording medium in relation to a personal picture image of said owner of said card-shaped optical recording medium;

a means for registering said ID information that is read out from said first recording area in a database in relation to said personal information that is prerecorded or newly recorded in said database; and a means for recording a reference information that is used for referring to said database in said rewritable second recording area.

8. The card issuing system in accordance with claim 7, said card issuing system further comprising another means for recording said ID information and personal information in said second recording area.

9. The card issuing system in accordance with claim 7, wherein said card-shaped optical recording medium comprises a first data recording area that is formed with a hologram, which outputs a predetermined reproduction pattern when irradiated with monochromatic light, and a second data recording area that is rewritable electronically, said card issuing system is further characterized in that a picture image is printed on a surface of said card-shaped optical recording medium preventing a surface of said second data recording area from being insulated while a surface of said first data recording area is kept transparent.

10. A card issuing system of issuing a card-shaped optical recording medium having a hologram, wherein said card-shaped optical recording medium comprises a first hologram area that is recorded with a first plurality of holograms and a second hologram area that is recorded with a second plurality of holograms, said card issuing system comprising:

a means for demolishing a predetermined number of said second plurality of holograms, which are recorded in said second hologram area;

a means for irradiating monochromatic light on each of said holograms in each of said hologram areas;

a means for taking a picture image that is reproduced from each of said holograms, which are irradiated with said monochromatic light;

a means for recognizing said reproduced picture image that is taken by said means for taking a picture image;

a means for producing an identification (ID) information that is used for identifying said card-shaped optical recording medium by combining each of picture images, which are recognized by said means for recognizing;

a means for inputting a personal information of owner of said card-shaped optical recording medium in relation to a personal picture image of said owner of said card-shaped optical recording medium; and a means for recording said personal information in said second hologram area.

11. A card certifying system of certifying a card-shaped optical recording medium having a plurality of independent holograms, comprising:

a means for demolishing a predetermined number of holograms;

a means for irradiating monochromatic light on each of said holograms;

a means for taking a picture image that is reproduced from eacn of said holograms, which are irradiated with said monochromatic light;

a first means for recognizing said reproduced picture image that is taken by said means for taking a picture image;

a means for producing an identification (ID) information that is used for identifying said card-shaped optical recording medium by combining each of picture images, which are recognized by said first means for recognizing;

a second means for recognizing said ID information;

a means for reading out a personal information corresponding to said ID information in an area that is registered in a database; and a means for displaying a part of said personal information.

12. A card certifying system of certifying a card-shaped optical recording medium having a data recording area that is composed of a plurality of independent holograms, and an IC module, said card certifying system comprising:

a means for demolishing a predetermined number of holograms;

a means for irradiating monochromatic light on each of said holograms;

a means for taking a picture image that is reproduced from each of said holograms, which are irradiated with said monochromatic light;

a means for recognizing a content of said reproduced picture image that is taken by said means for taking a picture image in comparison with a recognition parameter that is previously stored in a database;

a means for producing an identification (ID) information that is used for identifying said card-shaped optical recording medium and an access code (CSC) that makes access to said IC module by combining picture images, which are recognized by said means for recognizing a content;

a means for reading out card data that is recorded in said IC module;

a means for reading in a personal information of a card holder and a card ID information, which are registered in said database;

a means for displaying said card data that is read out from said IC module by said means for reading out card data;

a first means for comparing said personal information and card ID information, which are registered in said database, with said card data that is recorded in said IC module and recognition result that is performed by said means for recognizing a content, and for displaying result of comparing;

a means for inputting a personal ID number in addition to obtaining picture images of a face and a fingerprint of said cardholder;

a second means for displaying a result of certifying said cardholder by comparing said picture image that is stored in said database and IC module with said picture images, which are obtained by said means for inputting a personal ID number; and a means for writing history of certification and status of said card-shaped optical recording medium into said database and/or IC module.

13. The card certifying system in accordance with claim 12, said card certifying system further comprising a means for collecting a card-shaped optical recording medium, when said second means judges that said information, which is stored in said card-shaped optical recording medium, is different from an inputted information that is inputted by said means for inputting a personal ID information.

14. A card certifying system of certifying a card-shaped optical recording medium, which comprises a first data storage area that outputs a predetermined reproduction pattern that is formed having a plurality of independent holograms each including an ID information and a permission information so as to recognize the card-shaped optical recording medium, and a second data storage area, which stores a reference information of a database and becomes readable or writable by said permission information, said card certifying system comprising:

a means for demolishing a predetermined number of holograms;

a means for irradiating monochromatic light on each of said holograms;

a means for taking a picture image that is reproduced from each of said holograms, which are irradiated with said monochromatic light;

means for recognizing a content of said reproduced picture image that is taken by said means for taking a picture image in comparison with a recognition parameter that is previously stored in said database;

a means for producing an identification (ID) information that identifies said card-shaped optical recording medium and a permission information by combining said reproduced picture image that is recognized by said means for recognizing a content;

a first means for reading out said permission information from said first data storage area;

a second means for reading out said reference information that is stored in said second data storage area by utilizing said permission information that is read out by said first means for reading out permission information;

a means for obtaining at least a part of a personal information and a card ID infonnation, which are added with said reference information and previously registered in said database, by utilizing said reference information that is read out by said second means for reading out reference information;

a means for comparing said card ID information, which is obtained by said means for obtaining personal information and card ID information, with said ID information that is read out by said first means for reading out permission information; and a means for displaying at least one of a result information that is outputted from said means for comparing card ID information and a first information that is read out by said first means for reading out permission information and a second information that is read out by said second means for reading out reference information and a fourth information that is obtained by said means for obtaining personal information and card ID information.

15. The card certifying system in accordance with claim 14, wherein said second data storage area further stores said ID information, and wherein said first means for reading out further reads out said ID information, and wherein said second means for reading out further reads out said ID information that is stored in said second data storage area instead of said reference information by utilizing said permission information that is read out by said first means for reading out permission information, and wherein said means for obtaining personal information and card ID information further reads out said reference information and obtains at least a part of a personal information and a card ID information, which are added to said reference information and previously registered in said database, when said ID information that is read out by said first means for reading out permission information is coincide with said ID information that is read out by said second means for reading out reference information.

16. The card certifying system in accordance with claim 14, wherein a storage section for an access information is provided in any one area of said first data storage area, second data storage area and a recording area that is provided for a personal information in said database.

17. The card certifying system in accordance with claim 14, said card certifying system further comprising:

a means for inputting a face information, a fingerprint information or a personal ID information of a person who holds said card-shaped optical recording medium (cardholder);

a second means for comparing said face information, fingerprint information or personal ID information that is inputted by said means for obtaining personal information and card ID information with a face information, a fingerprint information or a personal ID information, which is included in said personal information that is registered in said database; and a means for outputting at least one information out of a result information that is result of comparison by said second means for comparing, its comparing history information, an access history information that makes access to said card-shaped optical recording medium, said permission information that is read out by said first means for reading out permission information, said reference information that is read out by said second means for reading out reference information and an information that is obtained by said means for obtaining personal information and card ID information, wherein said cardholder can be certified by result of comparison that is performed by said second means for comparing card ID information.

* * * * *